US008840468B1

(12) United States Patent
Jehamy et al.

(10) Patent No.: US 8,840,468 B1
(45) Date of Patent: Sep. 23, 2014

(54) FANTASY LEAGUE WEIGHTED AGGREGATION SYSTEM

(71) Applicant: Fantasy League Crunch LLC, San Diego, CA (US)

(72) Inventors: Alan Elie Jehamy, San Diego, CA (US); Marc Wornovitzky, San Diego, CA (US); Ilan Wornovitzky, San Diego, CA (US)

(73) Assignee: Fantasy League Crunch LLC, San Diego, CA (US)

( * ) Notice: Subject to any disclaimer, the term of this patent is extended or adjusted under 35 U.S.C. 154(b) by 0 days.

(21) Appl. No.: 14/177,148

(22) Filed: Feb. 10, 2014

Related U.S. Application Data

(63) Continuation-in-part of application No. 13/913,325, filed on Jun. 7, 2013, now Pat. No. 8,647,201.

(51) Int. Cl.
*A63F 13/00* (2014.01)

(52) U.S. Cl.
CPC ..................................... *A63F 13/00* (2013.01)
USPC .............................................. 463/31; 463/42

(58) Field of Classification Search
USPC ...................................................... 463/31, 42
See application file for complete search history.

(56) References Cited

U.S. PATENT DOCUMENTS

| | | | |
|---|---|---|---|
| 4,918,603 A | 4/1990 | Hughes et al. | |
| 5,846,132 A | 12/1998 | Junkin | |
| 7,001,279 B1 | 2/2006 | Barber et al. | |
| 7,614,944 B1 | 11/2009 | Hughes et al. | |
| 7,618,312 B1 | 11/2009 | Kasten | |
| 7,699,707 B2 | 4/2010 | Bahou | |
| 7,827,202 B2 | 11/2010 | Relyea et al. | |
| 7,985,134 B2 | 7/2011 | Ellis | |
| 8,052,521 B2 | 11/2011 | Webb et al. | |
| 8,099,182 B1 | 1/2012 | Kasten | |
| 8,105,159 B2 | 1/2012 | Robinson et al. | |
| 8,176,518 B1 | 5/2012 | Junkin et al. | |
| 8,192,260 B2 | 6/2012 | Fleming | |
| 8,210,916 B2 | 7/2012 | Ma et al. | |
| 8,366,551 B2 | 2/2013 | Thomas | |
| 8,403,756 B2 | 3/2013 | Baray et al. | |
| 2002/0107073 A1 | 8/2002 | Binney | |
| 2006/0046807 A1 | 3/2006 | Sanchez | |
| 2006/0183547 A1 | 8/2006 | McMonigle | |
| 2006/0183548 A1 | 8/2006 | Morris et al. | |
| 2006/0252476 A1 | 11/2006 | Bahou | |
| 2007/0021165 A1 | 1/2007 | Ma et al. | |
| 2007/0021167 A1 | 1/2007 | Ma et al. | |
| 2007/0021214 A1 | 1/2007 | Ma et al. | |
| 2007/0021853 A1 | 1/2007 | Ma et al. | |

(Continued)

*Primary Examiner* — Paul A D'Agostino
*Assistant Examiner* — Ankit Doshi
(74) *Attorney, Agent, or Firm* — ARC IP Law, PC; Joseph J. Mayo

(57) ABSTRACT

A fantasy league weighted aggregation system that accepts user selections and fantasy league data, applies a weighting to at least one or more players if a weighting exists, for example based on ratio of entry fees for leagues, etc., and displays an aggregate view of the combination based on the weighting. The aggregate view includes a plurality of player strength categories associated with each player such as a list of players for, favorable to, unfavorable to, neutral to and against the first user, the second user or the third user. Other embodiments may display a coarse grained favorable and unfavorable aggregate view. The system may also calculate a range of optimal scores for particular players according to a strategy to improve a standing in at least one league while minimizing loss of standing across multiple leagues or using other strategies.

20 Claims, 6 Drawing Sheets

(56) References Cited

U.S. PATENT DOCUMENTS

| | | |
|---|---|---|
| 2007/0022029 A1 | 1/2007 | Ma et al. |
| 2007/0060380 A1 | 3/2007 | McMonigle et al. |
| 2007/0100891 A1 | 5/2007 | Nee |
| 2008/0026804 A1 | 1/2008 | Baray et al. |
| 2008/0062318 A1 | 3/2008 | Ellis et al. |
| 2008/0064490 A1 | 3/2008 | Ellis |
| 2008/0066111 A1 | 3/2008 | Ellis et al. |
| 2008/0096664 A1 | 4/2008 | Baray et al. |
| 2008/0268951 A1 | 10/2008 | Gropp et al. |
| 2009/0066028 A1 | 3/2009 | Kimble |
| 2009/0082110 A1 | 3/2009 | Relyea et al. |
| 2009/0082111 A1 | 3/2009 | Smith et al. |
| 2009/0083322 A1 | 3/2009 | Relyea et al. |
| 2009/0181738 A1 | 7/2009 | Costin |
| 2009/0291750 A1 | 11/2009 | Herrmann |
| 2009/0325685 A1 | 12/2009 | Webb et al. |
| 2010/0093415 A1 | 4/2010 | Kasten |
| 2010/0137057 A1 | 6/2010 | Fleming |
| 2010/0210330 A1 | 8/2010 | Fleming |
| 2010/0279774 A1 | 11/2010 | Braig et al. |
| 2011/0028206 A1 | 2/2011 | Charchian |
| 2011/0028221 A1 | 2/2011 | Relyea et al. |
| 2011/0183731 A1 | 7/2011 | Barry |
| 2011/0230243 A1 | 9/2011 | Hereford et al. |
| 2011/0237317 A1 | 9/2011 | Nooran et al. |
| 2011/0256910 A1 | 10/2011 | Sloan |
| 2011/0281620 A1 | 11/2011 | Hays |
| 2011/0313793 A1 | 12/2011 | LaGiglia et al. |
| 2012/0052930 A1 | 3/2012 | McGucken |
| 2012/0231890 A1 | 9/2012 | Junkin et al. |
| 2012/0270614 A1 | 10/2012 | Robinson et al. |
| 2012/0282995 A1 | 11/2012 | Allen et al. |
| 2012/0289340 A1 | 11/2012 | Pawson |
| 2012/0316659 A1 | 12/2012 | Magas |
| 2012/0317046 A1 | 12/2012 | Myslinski |
| 2012/0329541 A1 | 12/2012 | Allen et al. |
| 2013/0005419 A1 | 1/2013 | Sediq |
| 2013/0045805 A1 | 2/2013 | Pennington et al. |
| 2013/0060757 A1 | 3/2013 | Myslinski |
| 2013/0079073 A1 | 3/2013 | Sharifi |

FANTASY LEAGUE WEIGHTED AGGREGATION SYSTEM

This application is a continuation in part of U.S. Utility patent application Ser. No. 13/913,325, filed 7 Jun. 2013, the specification of which is hereby incorporated herein by reference.

BACKGROUND OF THE INVENTION

1. Field of the Invention

One or more embodiments of the invention are related to fantasy league systems. More particularly, but not by way of limitation, at least one embodiment of the invention compares or otherwise combines at least one user's fantasy teams in at least one league with the additional user's fantasy teams, applies a weighting to one or more players if a weighting exists, and displays an aggregate view of the combination based on the weighting with a player favorability view for fantasy league players. The weighting may be based on the user's desire to beat another user in a particular league, based on the ratio of the amount of money spent to enter each league or based on any other item, ratio, function, event or anything parameter. The aggregate view may include a fine-grained display such as lists of players that are "for", i.e., only playing on fantasy teams for the at least one user, and playing on more teams for the at least one user than for the additional users and hence are favorable to the at least one user, and playing on an equal number of the at least one user's and additional user's teams and that are neutral to the at least one user, and playing on less teams for the at least one user than for the additional users and hence are unfavorable to the at least one user and only on the additional user's fantasy teams and hence are against the at least one user. Other embodiments may display a coarse-grained list of for/against or other subset or grouping of the fine-grained display for example. Embodiments thus enable a user to determine whether a current player performance should be cheered for or not at that moment, or is helping or hurting the overall fantasy performance of the user based on the related fantasy ownership of the players with respect to additional users or standings in the fantasy league so that a user may have favorability towards players that are not playing for the user if the players would help the user's standing in one or more fantasy leagues, for example if a lower standing user was to win against a higher ranking user other than a first user. For favorable and unfavorable players, the system may calculate a range of scores for one or more players that enables the user to support a player that may help the user in certain leagues and hurt the user in other leagues, wherein the range allows the user to advance in the most leagues or based on weighting of the leagues or players. Thus embodiments of the invention enable the first user to cheer or otherwise support a player that may hurt the standing of the first user in at least one league, but improve the standing of the first user in at least one league, for example a league that the first user has not made the playoffs yet in.

2. Description of the Related Art

Generally, fantasy leagues are common. There are many types of fantasy leagues that enable users to compete by picking players and forming teams related to sports, games, notoriety and many other characteristics. For example, sports fantasy leagues involve sports such as football, baseball, soccer, hockey, golf, cricket, auto racing, surfing, etc., and allow users to pick players to form their own team to compete against other users based on player performances, statistics, scores or a myriad of other types of values including simple head to head matchups. Game fantasy leagues involve games such as poker, blackjack, etc., and enable users to pick players to form their own team and compete against other users. Celebrity fantasy leagues enable users to pick a group of celebrities wherein scores are related to the number of pictures of celebrities that appear in various magazines.

Many sports fans are involved in multiple fantasy leagues for various sports. Current fantasy systems are generally standalone systems that do not provide information related to more than one league that a specific player is involved with in a meaningful or helpful manner. For example, there are no known systems that provide a display that informs a user whether to cheer or not if a specific player scores since that player may be on more opposing fantasy teams in various leagues that the user is involved with and that ratio of for/against can change every week. Hence, if a particular player scores a touchdown in a given game, a user may be informed to cheer since the user has the player on more fantasy teams that other players. However, if the same player scores again in a different game at a later date, other users may have drafted or traded for the player, meaning that the user should not cheer for the player at that later date since a touchdown from the player is hurting the user's fantasy league performance overall as the user owns the player less than other users over multiple leagues.

Known systems for sports fantasy leagues, accessible via mobile computers and/or web-applications, typically use algorithms and computations to help a user determine best player picks for a specific fantasy league. In addition, existing systems may display trade recommendations in one or more leagues using information associated with the values of one or more players. The values of one or more players are typically computed using statistical methods such as a player position, period of time, points, etc., and using projected statistics to rank players from best to worst for a given fantasy league. These systems are generally involved with the problem of obtaining or maintaining team rosters based on player performance, but they are incapable of displaying relative value of a player's performance with respect to a first user versus additional user's since the player may be on several fantasy teams associated with the first user as well as several fantasy teams associated with additional users in multiple leagues that the first user is in. Hence, these systems cannot readily determine if the first user is relatively benefiting from a player performance or not, for example if a particular player scores a touchdown, existing systems are unable to notify a user whether to cheer or not based on the various overall leagues that the user is in with respect to that player's ownership by other users in multiple leagues.

For example, United States Patent Publication 20120329541 to Allen et al., entitled "Fantasy Sports Neural Engine and Method of Using Same", discloses a neural engine that sums all leagues and determine best player pick using algorithms, computations, etc., to best simulate human reasoning, and pattern recognition. The network appears to be accessible and used on PCs, mobile phones, etc., and used for any recreational activity/sport. The system also appears to use historical performance information for at least two fantasy sports teams in at least two fantasy sports leagues, wherein the at least two leagues are associated with one sports draft; to arrive at a recommendation. The system also appears to use a trade comparator for trade recommendations in one or more leagues in one draft, and information regarding the values of the players in the leagues.

It appears as though the system of Allen et al. recognizes that a user in one league will participate in the same league for years, or multiple users in one league will play together in a different league, therefore all players' histories are stored and projected across all leagues for all years. In other words, all player statistics across multiple leagues are accessible by the neural engine to provide a better projection on what each player on each team is likely to do once drafted. Also, one member (user) appears to have access to all player statistics in the multiple leagues the member (user) is associated with, to assess player projections and tendencies across multiple leagues.

In addition, the neural engine of Allen et al. is capable of averaging, for example using a weighted average, of all statistical lists and projections across multiple leagues and teams to assess a likely good draft list of players. The neural engine appears to suggest tendencies, favorite players, favorite teams, and favorite positions of other teams in the league, including an opposing user's history. The engine suggests that the list provided may be used by an opposing member, and suggests a different pick. For example, the engine may provide prediction percentages of the chance an opposing member will choose a running back, wide receiver, etc. on an American Football fantasy league. In summary this system appears to be directed at the initial pick or trading of players and not displaying how the players are favorable versus other user's players, for example during a game. Hence, there is no way to know whether to celebrate a player's performance or not since although a user may have a particular player in multiple leagues, other users of varying numbers may also have the player.

The drawbacks of using such a neural engine is that the neural engine does not appear to use data accumulation to present a single interface showing player favorability from aggregated data. In addition, the engine does not appear to weight the players' and teams statistics to a user's (member) points, in order to determine favorability, without the need to include an opposing member's league data. Although the engine is capable of aggregating data across multiple leagues, for a single user, the engine does not appear to provide statistical recommendations as to whether a specific player from a specific team will hurt or help a specific user (member), based on the single user's points/history. For example, the engine may provide prediction percentages of the chance an opposing member will choose or draft a running back, wide receiver, etc., but not in regards to a specific player, of a specific position on a specific team, and not with respect to whether the player's current performance is beneficial to the first user or not based on the number of other user's which have already drafted the player in the multiple leagues the first user has a fantasy team in.

United States Patent Publication 20110237317 to Nooran et al., entitled "Apparatus and Method for Recommending Roster Moves In Fantasy Sports Teams", discloses a roster modification recommendation system for fantasy sports leagues. The system appears to use projected statistics on one or more players, on one team or several teams. The system mentions various statistical methods, such as position, period of time, etc, for recommending trade or acquisition to the user. The system is able to accumulate statistics (for a game, week, month, etc) and compare those to similar statistics of other fantasy teams in one league, or many leagues. For example, the system allows users to communicate with a server (web, app, etc) to get information on players and teams in one or more fantasy leagues owned by the same user. The system also appears to use statistics to determine scoring, project player statistics for specific players, using point projections in a specific league. The system may also compute demand for a player, using movement of players in other leagues, and provide a recommendation to the user.

While the system appears to disclose the use of multiple leagues for a single user, and accumulating data from the multiple leagues, the system does not specifically state whether the recommendations are based on a user's current and/or past history points for a specific player, and does not specifically aggregate data on a single player on a single interface, by stating whether a specific player is favored or "unfavored", associated with the user's historical moves, data, points, etc. The system is more geared towards comparisons of other leagues, to recommend a move on a single league, rather than a specific player, and for example does not indicate whether a particular performance by a particular player is something worth cheering about, or otherwise indicating whether the performance hurts or helps the user based on all of the leagues that the user has fantasy teams in.

United States Patent Publication 20110230243 to Hereford et al., entitled "Fantasy Sports Engine for Recommending Optimum Team Rosters", appears to disclose the use of multiple leagues and recommends whether a user should add/drop/trade players based on computations, for each league. However, the system of Hereford et al., does not appear to view statistics, history, etc., of each player across multiple leagues at once.

United States Patent Publication 20130045805 to Penning et al., entitle "Fantasy Sports Leagues Comprising Historical Players and/or Historical Results", appears to use multiple leagues in one application/server, however does not appear to provide recommendations using data aggregation across leagues for the same user, or indications as to whether a particular player's performance helps or hurts the overall fantasy league performance of a user having multiple fantasy teams in multiple leagues wherein the player may be on multiple other user's fantasy teams.

United States Patent Publication 20120270614 to Robinson et al., entitled "Method for Playing Fantasy Sports", appears to disclose a system that uses multiple teams/leagues and multiple players, and ranks all players across teams/leagues, individually. However, the system does not appear to aggregate players across leagues for a single user.

United States Patent Publication 20090082111 to Smith et al., entitled "System and Method for Connecting Users Based on Common Interests, Such As Shared Interests of Representations of Professional Athletes" appears to disclose a system connected to various sites, and aggregates data from the multiple sites. However, it appears that the multiple sites are not necessarily associated with the user's leagues and points, but rather other users' data/league information.

United States Patent Publication 200800268951 to Gropp et al., entitled "Data Visualization System for Fantasy Sporting Events", appears to disclose a system that views and compares statistics of various players, teams and leagues using a single interface, and ranks players from overall statistics. However, the system does not appear to provide an interface to the user for ranking or otherwise displaying the players in terms of overall favorability, "unfavorability", etc. over the user's points, with respect to whether the player is on more, less or equal number of other user's fantasy teams for example.

In summary, there are no known systems that utilize a fantasy league weighted aggregation system to use data accumulation to present a single interface showing player favorability from aggregated data, and weight the players' and teams statistics to a user's points, in order to determine favorability, without the need to include an opposing member's league data. In addition, there are no known system that are capable of aggregating data across at least one league, for a first user or with respect to other users having a standing in at least one league and provide statistical recommendations as to whether a specific player from a specific team is hurting or helping the first user, based on the first user's points/history, in regards to a specific player, of a specific position on a specific team or a match up against other users in a particular league other than the first user. With the popularity of fantasy sports leagues, a fan may be involved in several leagues, making it difficult to know if a specific player within each league is currently helping or hurting the first user's overall fantasy teams in at least one league for example. In addition, there are no known fantasy systems that enable favorability ratings to be calculated and/or displayed for users other than the first user and shown to the first user so that the first use may cheer for a player not on the first user's fantasy team if the player's performance would help the first user, e.g., allow a higher standing user to be defeated by a lower standing user, which would help the first user improve the first user's standing in a fantasy league. There are no known systems that enable weighting of a player based on the first user's desire to beat another user or win a particular league or based on the ratio of entry fees for the fantasy leagues or in any other manner to alter the favorability of a particular player, even if the player is not on the first user's fantasy team, wherein the player may actually help the first user move up in standings. There are no known systems that calculate a range of scores for one or more players to enable a user to support a player that may help the user in certain leagues and hurt the user in other leagues, wherein the range allows the user to advance in the most leagues. Hence there is a need for a fantasy league weighted aggregation system that presents a combined view of all the user's sports fantasy leagues and organizes the leagues in a manner allowing a user to determine whether a specific player is all for, favorable, neutral, unfavorable or all against at least one user versus additional user's fantasy teams.

BRIEF SUMMARY OF THE INVENTION

One or more embodiments described in the specification are related to sports league data systems, which are also known herein as sports leagues even if not related to a "sport", or specifically a fantasy league weighted aggregation system including a processor and generally multiple disparate fantasy sports databases hosted on at least one external server for example. In at least one embodiment of the invention, the processor may be configured to operate as a web-based application or an "app" on mobile computers such as laptop computers, notebook computers, tablet computer, Personal Digital Assistants and Smart phones.

In one or more embodiments, the processor bidirectionally communicates with at least one external server using a bidirectional communication link, accepts a first set of sports league data from at least one user, and accepts a second set of sports league data from the at least one external server associated with one or more additional users. In at least one embodiment, the at least one user may include at least a first user, a second user and a third user, and any other number of additional users.

The bidirectional communication link may include a receiver, transmitter, transceiver, antenna, USB cable, any other type of wireless link, any other type of hardwired communication link, or any combination thereof. In at least one or more embodiments, the processor may accept a first set of sports league data from the first user, the second user and/or the third user, e.g., accept input using a mobile computer or a web-based application, or voice recognition input using a mobile computer or a web-based application. In one or more embodiments of in the invention, the at least one external server may be one or more of at least one television network server, at least one web-based league data server and at least one mobile computer league data or any other type of server capable of storing fantasy league data for example.

By way of one or more embodiments, each of the first set of sports league data and the second set of sports league data includes at least one or more leagues the at least one user and the one or more additional users are associated with respectively, and wherein each of the one or more leagues the at least one user and the one or more additional users are associated with include one or more fantasy teams, one or more players within each of the one or more fantasy teams, player statistics associated with each of the one or more players and player achievements associated with each of the one or more players.

In at least one or more embodiments, the processor may accept at least one first user selection from the at least one user, combine the at least one user selection and the second set of a sports league data from the at least one external server, apply a weighting to at least the one or more players if the weighting exists, and display an aggregate view of the combination based on the weighting to make a combination. In at least one embodiment, the weighting may be one or more of generated by the processor and accepted from the at least one user. The at least one user selection may include one or more selections from the first set of sports league data, and wherein the at least one user selection may include the one or more leagues the at least one user is associated with and the one or more players the at least one user has previously selected with within the one or more leagues. For example, one or more of the first user selection, the second user selection or the third user selection may include a selection of at least one league of leagues from the one or more leagues the at least one user is associated with. In addition, for example, the first user selection from the first user, the second user and/or the third user may include one or more of a user selection of one or more players and a user selection of one or more leagues from the one or more leagues the at least one user is associated with.

In one or more embodiments of the invention, the aggregate view may include the player statistics of the one or more players associated with the at least one user, a combination of the player achievements associated with one or more of the first user, the second user, the third user, and from the second set of sports league data from the at least one external server associated with the one or more additional users, and a player favorability view of the one or more players. By way of one or more embodiments, the player favorability view may be based on the weighting of the at least one or more players and may include a plurality of player strength categories associated with each player of the one or more players, such that the plurality of player strength categories includes a first player category, a second player category, a third player category, a fourth player category and a fifth player category or any other number of player categories, for example as in "for" and "against" coarse grained embodiments described below.

According to one or more embodiments, each player category of the five player categories provides a list of favorability ratings based on the first user's selection of one or more players versus one or more players from the one or more additional users. In at least one or more embodiments, the first player category lists players that are for the first user, the second user or the third user and are only on one or more fantasy teams from one or more of fantasy teams associated with the first user, the second user or the third user and not the one or more additional users. The second player category lists players that are favorable to the first user and are on one or more fantasy teams from the one or more fantasy teams associated with the first user, the second user or the third user, than are on one or more fantasy teams from the one or more fantasy teams associated with the one or more additional users. The third player category lists players that are neutral to the first user, the second user or the third user, and are on the same number of fantasy teams from the one or more fantasy teams associated with the first user, the second user or the third user, and the one or more additional users. The fourth player category lists players that are unfavorable to the first user, the second user or the third user, and are on less fantasy teams from the one or more fantasy teams associated with the first user, the second user or the third user than are on fantasy teams from the one or more fantasy teams associated with the one or more additional users. The fifth player category lists players that are against the first user, the second user or the third user, and are only on fantasy teams from the one or more fantasy teams associated with the first user, the second user or the third user and not associated with the one or more additional users. Other brief views may be utilized of "more for" or "more against" such that a coarser grained "cheer" or "no cheer" indication or favorability rating may be provided to the user alone or in combination with the five player category fine-grained favorability rating. By enabling the first user to have a favorability of players that may not even be playing for the first user if the player is in a match up between the second and third user wherein the player would help the first user move up in the standings in a fantasy league, the system enables a first user to view a favorability for other players that may help the first user, which is unknown in the art. The first user may also provide a weighting to the first user's players or other user's teams or players to enable the first user to view a favorability that is weighted based on the first user's desire to win a particular league, beat another user, have a second user lose to a third user to improve the first user's standing in at least one league, and based on any parameter including the ratio of entry fees for the leagues or any other value.

In at least one or more embodiments of the invention, the processor may also accept a second user selection from the first user, such that the second user selection could include one or more additional selections from the first set of sports league data, different from the first user selection. For example, the first user selection may include a selection of one or more fantasy teams the first user is associated with, and the second user selection may include one or more players within the one or more fantasy teams.

In one or more embodiments of the invention, the player statistics of the one or more players associated with the first user, the second user or the third user may include the first user having a first standing in the one or more leagues, or the second user having a second standing in the one or more leagues or the third user having a third standing in the one or more leagues or any combination thereof. In at least one embodiment, the second user may have a lower standing in the one or more leagues than the first user and is in a matchup with the third user, wherein the third user may have a higher standing in the one or more leagues than the first user, or visa versa.

In at least one embodiment of the invention, the first player category that lists players that are for the first user, or the second user or the third user may include a list of players that are for the first user or for the second user having a lower standing in the one or more leagues than the first user, and are only on one or more fantasy teams from one or more of fantasy teams associated with the first user or the second user and not the one or more additional users or the third user.

In one or more embodiments of the invention, the second player category that lists players that are favorable to the first user, the second user or the third user may include a list of players that are favorable to the first user or the second user having a lower standing in the one or more leagues than the first user, and are on one or more fantasy teams from the one or more fantasy teams associated with the first user or the second user than are on one or more fantasy teams from the one or more fantasy teams associated with the one or more additional users or the third user.

In at least one embodiment of the invention, the third player category that lists players that are neutral to the first user, the second user or the third user may include a list of players that are neutral to the first user or for the second user having a lower standing in the one or more leagues than the first user and are on the same number of fantasy teams from the one or more fantasy teams associated with the first user or the second user and the one or more additional users or the third user.

In one or more embodiments, the fourth player category that lists players that are unfavorable to the first user, the second user or the third user may include a list of players that are unfavorable to the first user or for the second user having a lower standing in the one or more leagues than the first user and are on less fantasy teams from the one or more fantasy teams associated with the first user or the second user, than are on fantasy teams from the one or more fantasy teams associated with the one or more additional users or the third user.

In at least one embodiment, the fifth player category that lists players that are against the first user, the second user or the third user may include a list of players that are against the first user or for he second user having a lower standing in the one or more leagues than the first user, and are only on fantasy teams from the one or more fantasy teams associated with the first user or the second user and not associated with the one or more additional users or the third user.

By way of at least one embodiment, the processor may apply a zero weighting to players on the fantasy teams associated with the second user and the third user to display matchups that involve the first user. In one or more embodiments, the processor may apply a non-zero weighting to players on the fantasy teams associated with the second user and the third user to display other matchups that do not involve the first user. In one or more embodiments, if no weighting is available then the system may bypass any checking for any weighting hence making the applying of the weighting optional and therefore requiring no action on the part of the system.

For favorable and unfavorable players, for example players that are on some teams associated with the first user versus the first user's opponent's team, or on two other users that the first player is not directly playing, but which the outcome is of interest to the first user so that the first user may improve standing in the league, the system may calculate a range of scores for one or more players that enables the user to support a player that may help the user in certain leagues and hurt the user in other leagues, wherein the range allows the user to advance in the most leagues or based on weighting of the leagues or players.

According to one or more embodiments of the invention, the processor may accept one or more of an entry to at least one selected league of the one or more leagues from the first user, the second user or the third user, and a ratio of entry fees of the at least one selected league of the one or more leagues paid for by one or more of the first user, the second user or the third user. In at least one embodiment, the weighting may be based on one or more of the first user entry, the second entry or the third user entry to the at least one selected league, and the ratio of entry fees of the at least one selected league.

In one or more embodiments, the processor may keep track of the one or more standings of one or more of the first user, the second user and the third user, and of the one or more additional users, and display the one or more standings. In at least one embodiment, the processor may apply the weighting based on the one or more standings, and may change the weighting based on the one or more standings of the first user, the second user and/or the third user and the one or more additional users. In one or more embodiments, the favorability view may include an indication of the selected one or more players that may improve the first user's standings, the second user's standings and/or the third user's standings.

By way of at least one embodiment, the processor may display one or more match-ups between the first user, the second user or the third user and the one or more additional users. In one or more embodiments, the one or more match-ups may include the selected one or more players of the one or more players not associated with the first user, the second user or the third user and that may improve the first user's, second user's or third user's one or more standings. The system may calculate the players on lower standing user's teams that my most help the first user and show any combination of the favorability of other user's players in combination with or on a different view provided by the system to the user.

According to at least one embodiment of the invention, the processor may display one or more playoff eligibility categories associated with the first user, the second user or the third user, and associated with one or more games of the one or more leagues, and may change the weighting based on the one or more playoff eligibility categories.

In one or more embodiments, the processor may select and display one or more games associated with the one or more fantasy teams of the first user, the second user or the third user, wherein the one or more games is associated with at least one player of the one or more players. In at least one embodiment, the processor may select and display the at least one players of the one or more players.

By way of one or more embodiments, the processor may filter the aggregate view to display players of the at least one player currently playing in the selected one or more games. In at least one embodiment, the processor may filter the aggregate view to hide players of the at least one player not currently playing in the selected one or more games.

In at least one or more embodiments, each of the first set of sports league data and the second set of sports league data may include one or more of American football, basketball, soccer, hockey, baseball, bowling, poker, billiards, or any other sport league data, whether professional, amateur, college or any other level, or any combination of sports league data as known to one of ordinary skill in the art. In at least one embodiment, each of the first set of sports league data and the second set of sports league data may include one or more of live-feedback data during a sports game and previous data attained during previous sports games.

For example, during a live sports game, live-feedback data may include points scored by one or more players and/or yardage attained by one or more players using the one or more of the at least one external server, which is automatically obtained by the fantasy league weighted aggregation system processor for automatic updating. In one or more embodiments, the processor automatically updates the player favorability view using the second set of sports league data from one or more of the at least one external server, such as by updating one or more of the first player category, the second player category, the third player category, the fourth player category and the fifth player category. Embodiments may poll the at least one external server or sports feed websites or receive event based messages or any combination thereof in order to obtain the performance data. Embodiments may then display the fine-grained five category favorability rating or may display the coarse-grained two category favorability rating or both, or any other subset of the fine-grained category favorability rating as desired or tailored for the particular device display for example.

In one or more embodiments, players may be active or benched, e.g., not playing in the particular matchup, and embodiments of the invention may display favorability with respect to active players that are asserted for the particular game for a particular user. This enables concise views for fantasy leagues having teams with depth or more players on each fantasy team that can or do play in a particular game for example.

According to at least one embodiment of the invention, the player favorability view may include a player statistics view. The play statistics view, for example, may have the player statistics associated with one or more of the players, and the player statistics associated with each of the one or more players may include a player name, the player team, the player position and a number of leagues the player is competing in. In one or more embodiments, the number of leagues a player is competing in may be determined from one or more of the first user selections from the at least one user, and may also be determined and selected by the at least one user using a user input and/or automatically generated using the at least one external server.

By way of one or more embodiments, the player favorability view may also include player achievements view that may include player achievements associated with one or more of the players. The player achievements associated with each of the one or more players may include one or more of a player yardage, the player points scored during a game, the player catches, the player runs, the player passes, the player interceptions, or any other offensive or defensive play the player attains, or any other statistics related to the specific sport for example, or any combination thereof as one of ordinary skill in the art will recognize.

Other embodiments may also display a informatory message after a performance that enables the user to cheer or not cheer or otherwise inform additional users as to the at least one user's fantasy team performance, e.g., a taunting message for the at least one user to relay or that is automatically texted or otherwise transmitted to the additional user or users such as "User XYZ's Fantasy Team moves up two spots in your Fantasy League based on your Fantasy Players relatively dismal performance today." Any other type or form of auto-taunt message may be presented by the system, e.g., selected from a list or by random by the system and presented to the user to approve and send for example without requiring the user to type in an extensive taunt, which provides more immediate communication with opponents. Weightings may be automatically adjusted in the system based on received taunting messages. This enables the system to dynamically change favorability based on the user's desire to beat other user's in one or more fantasy leagues.

In at least one embodiment of the invention, the processor may display a league view, such that the league view may include a list of one or more leagues from the one or more leagues, and wherein the processor may also enable the at least one user to select one or more leagues from the list to view in the league view and deselect one or more leagues from the list to not view in the league view. For example, if the at least one user is associated with three leagues, the at least one user is able to select a first league and a second league to view in the league view, and deselect a third league. In addition, for example, to compare sports league data, the at least one user is able to deselect any of the first league or second league, and select the third league, or select all three leagues. One of ordinary skill in the art will recognize that any other number of leagues is within the scope of the invention. In addition, embodiments of the system may display each week or day of the league performance depending on the game intervals for the specific sport, so that the user may scroll back and forward in time to view favorability of players over time for example. Embodiments of the invention may also filter favorability views, for example show players based on currently played games, or a subset thereof, i.e., the game the user is watching, and/or remove players from the favorability views after their games have finished or before their games have begun or based on thresholds of favorability, etc.

According to one or more embodiments, the league view may include a display of time of contest, a display of the one or more players in each of the selected leagues the at least one user selects, a display of one or more active or bench players in each of the selected leagues the at least one user selects and a display of one or more opponent players in each of the selected leagues the at least one user selects. In one or more embodiments of the invention, the display of the one or more players includes a player name, a player team, a player position and a player points for each of the one or more players, and the display of one or more active or bench players includes a player name, a player team and a player position for each of the one or more players, and the display of one or more opponent players includes a player name, a player team, a player position and a player points for each of the one or more players. It is noted wherein each of the displays may further include any other sports league data information pertinent to the type of sport the at least one user is associated with. For example, one or more sports may not necessarily include any bench players, whereas other sports may include additional type of players such as a next batter up in baseball.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

A fantasy league weighted aggregation system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
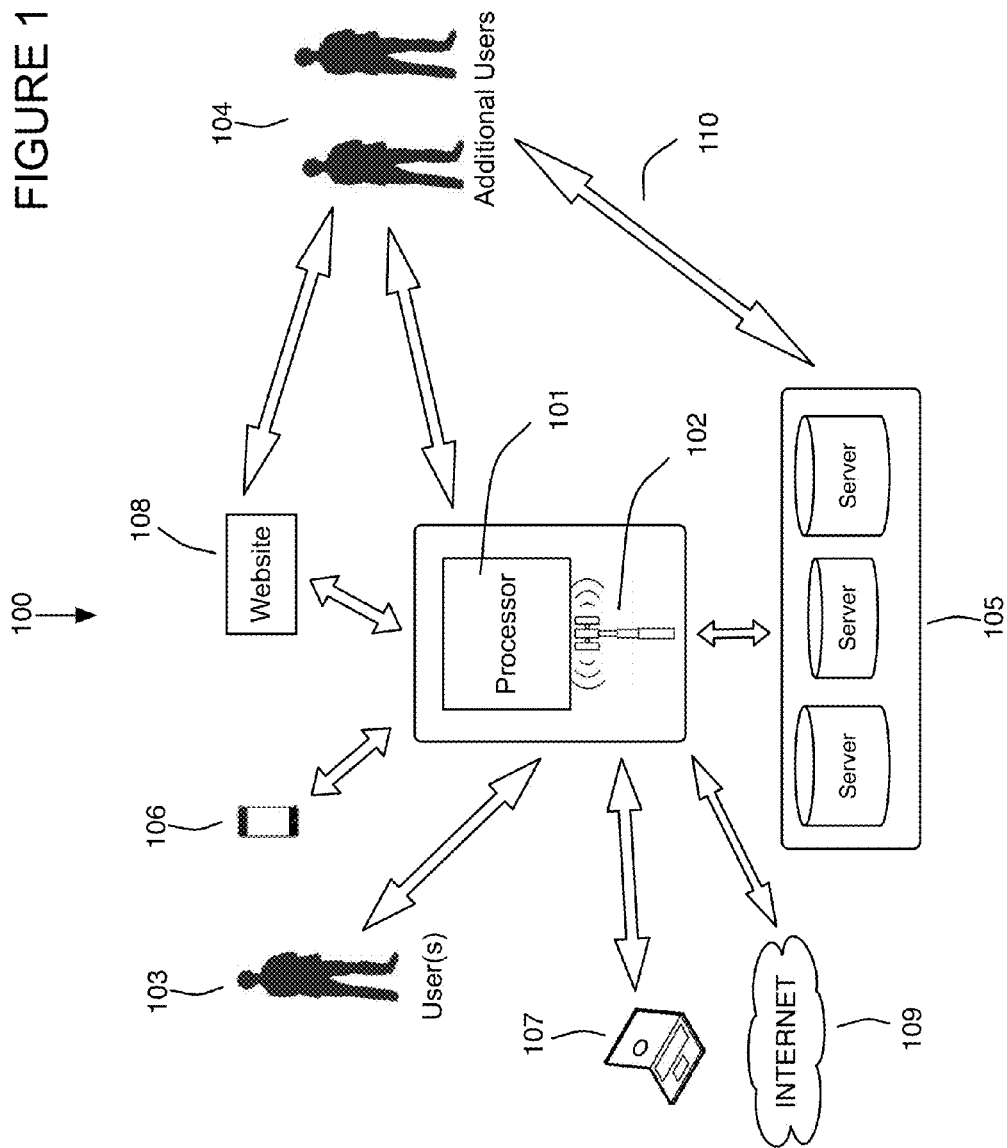
FIG. 1 shows an overall architecture diagram of the fantasy league weighted aggregation system.

FIG. 1 shows an overall architecture diagram of the fantasy league weighted aggregation system 100. One or more embodiments, the fantasy league weighted aggregation system 100 includes a processor 101, for example that may host a website for the system, or otherwise provide access to aggregation information for the one or more fantasy leagues and teams therein for each user. Embodiments of the processor may charge for access to the aggregation system or otherwise provide advertisements or data mining capabilities. Alternatively, or in combination, processor 101 may be implemented as a personal computer for example, or processor 101 may reside within any of the other computers shown in FIG. 1. Processor 101 is shown as a separate component for exemplary purposes only as one skilled in the art will recognize as multi-processor architectures, distributed architectures, peer-to-peer architectures may also be utilized in keeping with the spirit of the invention. In addition, the system may include a bidirectional communication link 102, at least one user 103, such as a first user, a second user and a third user, one or more additional users 104 which may include the second and third user and at least one external server 105, wherein multiple disparate fantasy sports databases may be hosted on the at least one external server 105, for example. In at least one embodiment of the invention, the processor 101 may operate as, may be associated with, and/or may be in bidirectional communication with, a web-based application or an "app" on mobile computers such Smart phones 106, laptop computers 107, or any other type of computer including but not limited to notebook computers, tablet PCs, Personal Digital Assistants, using the bidirectional communication link 102.

In one or more embodiments, the processor 101 bidirectionally communicates with the at least one user 103, the one or more additional users 104, mobile phone 106, mobile computer 107, website 108 and other data providers over the Internet 109. In one or more embodiments, the processor 101 bidirectionally communicates with the at least one external server 105 using the bidirectional communication link 102, accepts a first set of sports league data from the at least one user 103, and accepts a second set of sports league data from the at least one external server 105 associated with the one or more additional users 104. In one or more embodiments, the at least one external server 105 is in bidirectional communication with the one or more additional users 104, depicted by element 110. The bidirectional communication link 102 may include a receiver, transmitter, transceiver, antenna, USB cable, any other type of wireless link, any other type of hardwired communication link, or any combination thereof. In at least one or more embodiments, the processor 101 may accept a first set of sports league data from the at least one user 103 using physical software input using a mobile computer 106 or a web-based application from a website 108, from a database or information provide over the Internet 109, or voice recognition input using the mobile computer, processor 101 or the web-based application, or in any other manner. In one or more embodiments of in the invention, the at least one external server 105 may be one or more of at least one television network server, at least one web-based league data server and at least one mobile computer league data, or any other computer system configured to host at least one fantasy league and data associated therewith.

By way of one or more embodiments, each of the first set of sports league data and the second set of sports league data includes at least one or more leagues the at least one user 103 and the one or more additional users 104 are associated with respectively, and wherein each of the one or more leagues the at least one user 103 and the one or more additional users 104 are associated with include one or more fantasy teams, one or more players within each of the one or more fantasy teams, player statistics associated with each of the one or more players and player achievements associated with each of the one or more players.

Figure 2:
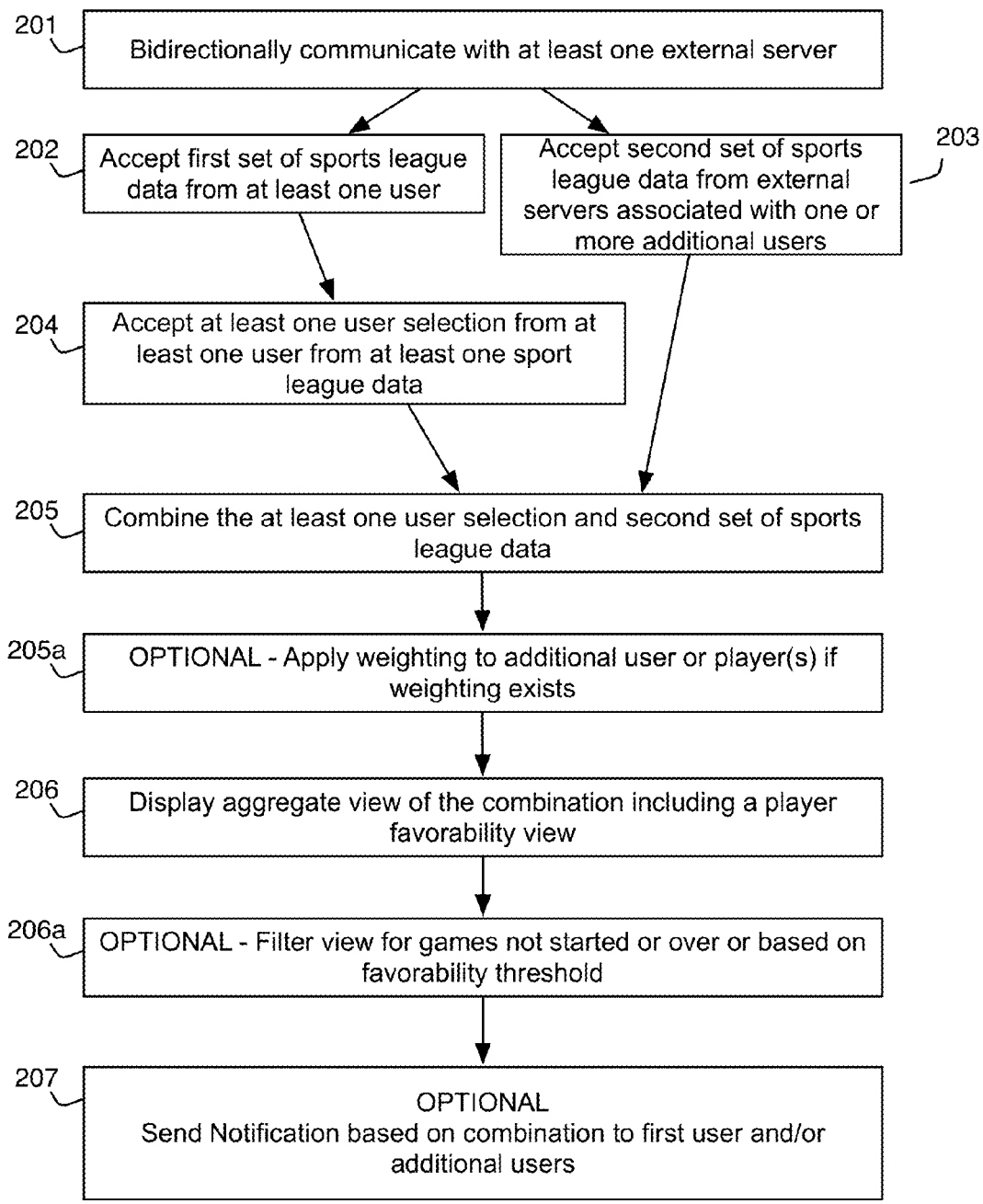
FIG. 2 shows a flow chart for an embodiment of the method that displays favorability relative to the user's fantasy players versus additional users.

FIG. 2 shows a flow chart for an embodiment of the method that displays favorability relative to the user's fantasy players versus additional users. In at least one or more embodiments, at step 201 the processor 101 bidirectionally communicates with the at least one external server 105, at step 202 the processor 101 may accept a first set of sports league data from the at least one user 103, and at step 203 the processor 101 may accept a second set of sports league data from the at least one external server 105 associated with the one or more additional users 104. In at least one embodiment of the invention, steps 202 and 203 may occur simultaneously, or may occur individually at separate times. In one or more embodiments, after the processor 101 accepts the first set of sports league data from the at least one user 103, the processor may accept a at least one user selection from the at least one user 103 from the sports league data at step 204. By way of one or more embodiments, at step 205, the processor may combine the at least one user selection from step 204 and the second set of sports league data from the at least one external server from step 203, may apply a weighting to at least the one or more players if the weight exists at 205a, and may display an aggregate view of the combination based on the weighting if any exists at step 206, including, for example, a player favorability view. In at least one embodiment, the weighting may be one or more of generated by the processor 101 and accepted from the at least one user 103. The favorability view may be filtered at 206a based on games not yet started or already over or based on favorability threshold or whether the player's are associated with the user or if the players are associated with the second or third user even if not on the first user's fantasy team, etc.

In one or more embodiments of the invention, the processor 101 may optionally send a notification to the at least one user 103 at step 207 and send a notification to the one or more additional users 104, based on the combination from step 206. In at least one embodiment, the processor 101 may send a notification to the at least one user 103 or the one or more additional users 104 using sound notification, tactile notification, web-based notification, mobile-phone based notification and application based notification, or any combination thereof, such as via an e-mail notification, a ringtone alert, a vibration, a text message, or a pop-up alert on one or more devices associated with the at least one user 103 and/or the one or more additional users 104.

By way of one or more embodiments, the first user selection from the at least one user 103 may include one or more selections from the first set of sports league data, and wherein the first user selection may include the one or more leagues the at least one user 103 is associated with and the one or more players the at least one user 103 has previously selected within the one or more leagues.

In at least one or more embodiments of the invention, the processor 101 may also accept a second user selection from the at least one user 103, such that the second user selection could include one or more additional selections from the first set of sports league data, different from the first user selection. For example, the first user selection, the second user selection or the third user selection may include a selection of one or more fantasy teams the at least one user is associated with, and the second user selection may include one or more players within the one or more fantasy teams, or which leagues to show in an aggregated view. As one of ordinary skill in the art would appreciate, any other selection combination within the first set of sports league data is within the scope of the invention.

By way of one or more embodiments, each of the first set of sports league data and the second set of sports league data may include one or more of American or Australian rules football, basketball, soccer, hockey, baseball, bowling, or any other sport, game or notoriety fantasy league data, or combination of fantasy league data as known to one of ordinary skill in the art. In one or more embodiments, each of the first set of sports league data and the second set of sports league data may include one or more of live-feedback data during a sports game and previous data attained during previous sports games.

For example, during a live sports game, live-feedback data may include points scored by one or more players and/or yardage attained by one or more players using the at least one external server 105, which is automatically obtained by the fantasy league weighted aggregation system for example via processor 101 or any other processor on any other computer as per FIG. 1, to automatically update information. In one or more embodiments, the processor 101 may automatically update the player favorability view using the second set of sports league data from the at least one external server 105, such as by updating one or more of a first player category, a second player category, a third player category, a fourth player category and a fifth player category; as will be further described below. Embodiments may poll the at least one external server 105 or sports feed websites or receive event based messages or any combination thereof in order to obtain the performance data. Embodiments may then display a fine-grained five category favorability rating or may display a coarse-grained two category favorability rating or both, as will be further described below, or any other subset of the fine-grained category favorability rating as desired or tailored for the particular device display for example.

In one or more embodiments of the invention, the aggregate view may include the player statistics of the one or more players associated with the at least one user 103, a combination of the player achievements from the first user selection, the second user selection or the third user selection, and from the second set of sports league data from the at least one external server associated with the one or more additional users 104, and a player favorability view of the one or more players. By way of one or more embodiments, the player favorability view may include a plurality of player strength categories associated with each player of the one or more players, such that the plurality of player strength categories includes the first player category, the second player category, the third player category, the fourth player category and the fifth player category.

Figure 3:
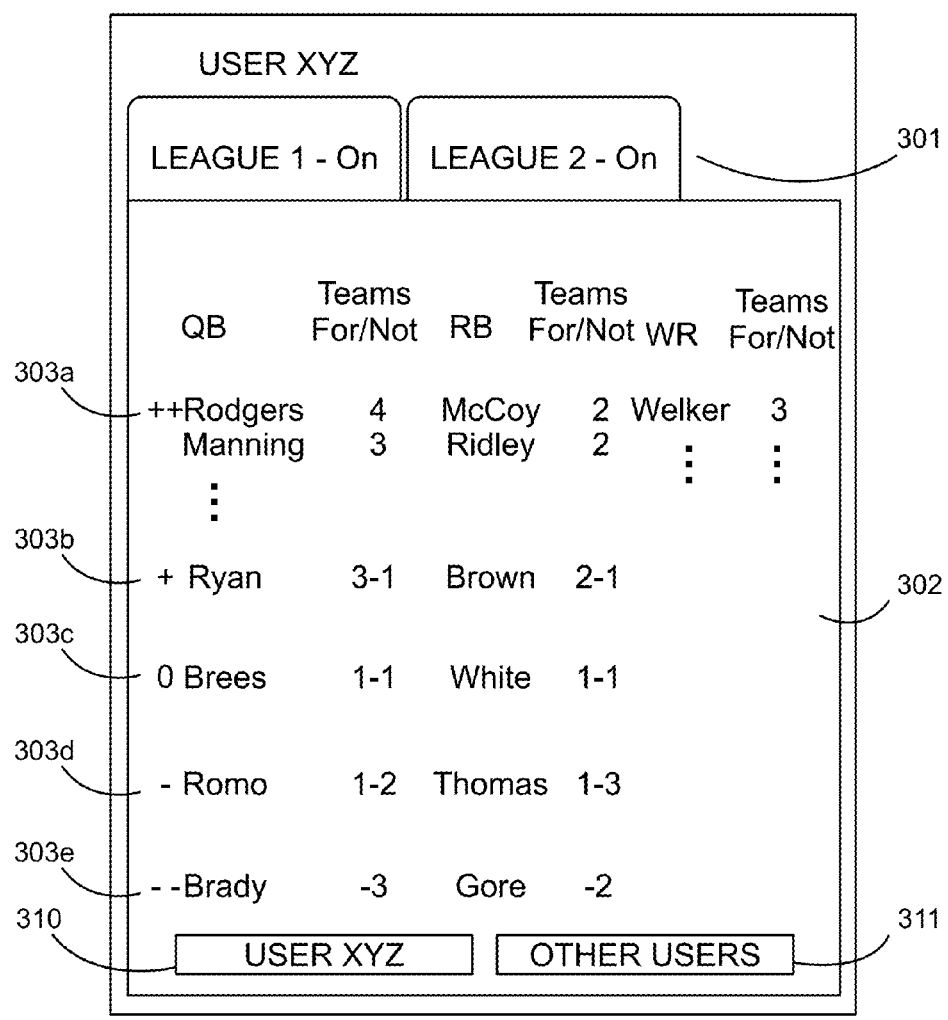
FIG. 3 shows an exemplary favorability display associated with the user's fantasy players across at least one league versus additional user's fantasy players.

FIG. 3 shows an exemplary favorability display and league display, or favorability view and league view, associated with the user's fantasy players across at least one league versus additional user's fantasy players. The figure displays the exemplary favorability view and league display on a computer screen, however it is noted that any screen may be used to display the player favorability views and league views, including but not limited to desktop computers, laptop computers, tablet computers, Smart phones, or any other type of computer.

As shown in FIG. 3, in at least one embodiment of the invention, the processor 101, or again any other processor shown in FIG. 1, may display a league view, such that the league view may include a list of one or more leagues 301, from the one or more leagues. The list of one or more leagues 301 includes two leagues associated with the at least one user 103, "LEAGUE 1" and "LEAGUE 2", however it is noted that any number of leagues remains within the scope of the invention as one of ordinary skill in the art would appreciate. The processor 101 may also enable the at least one user to select one or more leagues, from the list of leagues 301, to view in the aggregated league view shown in area 302 and deselect one or more leagues from the list to not view in the aggregated league view. This enables selectively viewing of subsets of all of the fantasy leagues a user is in to see if overall performance is better or worse in subset of the leagues. For example, if the at least one user is associated with three leagues, the at least one user is able to select a first league and a second league to view in the league view, and deselect a third league. In addition, for example, in order to compare sports league data, the at least one user 103, such as "USER XYZ", is able to deselect any of the first league or second league, and select the third league, or select all three leagues. FIG. 3 depicts wherein "LEAGUE 1" and "LEAGUE 2", of "USER XYZ" are on, however "USER XYZ" may deselect one or more of the leagues to turn the one or more leagues off and not display the deselected one or more leagues in the league view. Furthermore, according to at least one embodiment of the invention, as the at least one user 103 selects or deselects one or more leagues to view in the league view, the player favorability view changes accordingly, by changing and updating a display of the one or more players in each of the selected leagues the at least one user selects, a display of one or more bench players in each of the selected leagues the at least one user selects and a display of one or more opponent players in each of the selected leagues the at least one user selects. This enables the user to determine which leagues need attention, e.g., trades to improve performance in for example. In addition, embodiments of the system may display each week or day of the league performance depending on the game intervals for the specific sport, so that the user may scroll back and forward in time to view favorability of players over time for example see FIGS. 4 and 5.

According to one or more embodiments, the league view may include a display of time of contest (not shown), the display of the one or more players in each of the selected leagues the at least one user selects, the display of one or more active or optionally bench players in each of the selected leagues the at least one user selects and the display of one or more opponent players in each of the selected leagues the at least one user selects, as shown at 302. In one or more embodiments of the invention, the display of the one or more players 302 includes a player name, a player team, a player position and player points for each of the one or more players, and the display of one or more active or optionally bench players includes a player name, a player team and a player position for each of the one or more players, and the display of one or more opponent players includes a player name, a player team, a player position and a player points for each of the one or more players. It is noted wherein each of the displays may further include any other sports league data information pertinent to the type of sport the at least one user is associated with. For example, one or more sports may not necessarily include any bench players, whereas other sports may include additional type of players such as a next batter up in baseball.

According to one or more embodiments, each player category of the five player categories provides a list of favorability ratings based on the at least one user's 103 selection of one or more players versus one or more players from the one or more additional users 104. In at least one or more embodiments, the first player category 303a, shown as a "++" list that lists players that are for the first user, the second user or the third user and are only on one or more fantasy teams from one or more of fantasy teams associated with the first user, the second user or the third user, and not the one or more additional users. The first user's players may be shown for example if user interface element 310 is asserted, for example by default or by clicking, or in any other manner, so that the first user's players are shown in the favorability view. Other players for other users may be shown by asserting user interface element 311, or in any other manner, together or separate from the first user's players, for example players that are on other user's teams wherein the other users have higher and lower standing than the first user and for which the lower standing player may have favorability associated with their players so that the first user may cheer for these players to defeat a higher standing user, wherein the higher standing user may have unfavorability associated with their players. This enables the first user to cheer for players that they may not even have on their fantasy team, or which normally would be unfavorable if it helps the first user improve their standing in one or more leagues. The second player category 303b, shown as a "+" list that lists players that are favorable to the first user, the second user or the third user, and are on one or more fantasy teams from the one or more fantasy teams associated with the first user, the second user, or the third user, than are on one or more fantasy teams from the one or more fantasy teams associated with the one or more additional users. The third player category 303c, shown as a zero or "0" list that lists players that are neutral to the first user, the second user or the third user, and are on the same number of fantasy teams from the one or more fantasy teams associated with the first user, the second user or the third user and the one or more additional users. The fourth player category 303d, shown as a "-" list that lists players that are unfavorable to the first user, the second user or the third user, and are on less fantasy teams from the one or more fantasy teams associated with the first user, the second user or the third user, than are on fantasy teams from the one or more fantasy teams associated with the one or more additional users. The fifth player category 303e, shown as a "- -" list that lists players that are against the first user, the second user or the third user, and are only on fantasy teams from the one or more fantasy teams associated with the first user, the second user or the third user and not associated with the one or more additional users. Any other user interface elements or groupings, colors, bold fonts or any other display technique may be utilized to convey the player categories as one skilled in the art will recognize. Other brief views may be utilized of "more for" or "more against" such that a coarser grained "cheer" or "no cheer" indication or favorability rating may be provided to the user alone or in combination with the five player category fine-grained favorability rating. For example if the "other users" interface element 311 is currently asserted and then clicked on to disable the selection and if player "Brees" was only on the second and third user's teams, then this player may be eliminated from the view. If the user interface element 310 is currently asserted and then clicked on to disable the selection, then all players associated with the first user may be eliminated from the view. Having both user interface elements 310 and 311 asserted shows all players that may help the first user's standings in the league even if the players shown are not on the first user's team, so long as the players may help or hurt the first user's standing in the league.

According to at least one embodiment of the invention, the player favorability view may include a player statistics view. The play statistics view, for example, may have the player statistics associated with one or more of the players, and the player statistics associated with each of the one or more players may include a player name, the player team, the player position and a number of leagues the player is competing in, as shown in 302 such as with Rodgers, Manning, Ryan, Brees, etc. under the Quarterback (QB) position. In one or more embodiments, the number of leagues a player is competing in may be determined from one or more of the first user selection from the at least one user 103 and the second user selection from the at least one user 103, and may also be determined and selected by the at least one user 103 using a user input and/or automatically generated using the one or more of the at least one external server 105.

In one or more embodiments of the invention, the player statistics of the one or more players associated with the first user, the second user or the third user may include the first user having a first standing in the one or more leagues, or the second user having a second standing in the one or more leagues or the third user having a third standing in the one or more leagues or any combination thereof. In at least one embodiment, the second user may have a lower standing in the one or more leagues than the first user and is in a matchup with the third user, wherein the third user may have a higher standing in the one or more leagues than the first user. Although in one or more embodiments the first user's or second and third user's player may be selectively displayed as per user interface elements 310 and 311 respectively, any other method of showing the players is in keeping with the spirit of the invention.

In at least one embodiment of the invention, the first player category 303a that lists players that are for the first user, or the second user or the third user may include a list of players that are for the first user or for the second user having a lower standing in the one or more leagues than the first user, and are only on one or more fantasy teams from one or more of fantasy teams associated with the first user or the second user and not the one or more additional users 104 or the third user.

In one or more embodiments of the invention, the second player category 303b that lists players that are favorable to the first user, the second user or the third user may include a list of players that are favorable to the first user or the second user having a lower standing in the one or more leagues than the first user, and are on one or more fantasy teams from the one or more fantasy teams associated with the first user or the second user than are on one or more fantasy teams from the one or more fantasy teams associated with the one or more additional users 104 or the third user.

In at least one embodiment of the invention, the third player category 303c that lists players that are neutral to the first user, the second user or the third user may include a list of players that are neutral to the first user or for the second user having a lower standing in the one or more leagues than the first user and are on the same number of fantasy teams from the one or more fantasy teams associated with the first user or the second user and the one or more additional users 104 or the third user.

In one or more embodiments, the fourth player category 303d that lists players that are unfavorable to the first user, the second user or the third user may include a list of players that are unfavorable to the first user or for the second user having a lower standing in the one or more leagues than the first user and are on less fantasy teams from the one or more fantasy teams associated with the first user or the second user, than are on fantasy teams from the one or more fantasy teams associated with the one or more additional users 104 or the third user.

In at least one embodiment, the fifth player category 303e that lists players that are against the first user, the second user or the third user may include a list of players that are against the first user or for he second user having a lower standing in the one or more leagues than the first user, and are only on fantasy teams from the one or more fantasy teams associated with the first user or the second user and not associated with the one or more additional users 103 or the third user.

By way of at least one embodiment, the processor 101 may apply a zero weighting to players on the fantasy teams associated with the second user and the third user to display matchups that involve the first user. In one or more embodiments, the processor 101 may apply a non-zero weighting to players on the fantasy teams associated with the second user and the third user to display other matchups that do not involve the first user. See FIG. 4 for an exemplary weighting embodiment.

According to one or more embodiments of the invention, the processor 101 may accept one or more of an entry to at least one selected league of the one or more leagues from the first user, the second user or the third user, and a ratio of entry fees of the at least one selected league of the one or more leagues paid for by one or more of the first user, the second user or the third user 103. In at least one embodiment, the weighting may be based on one or more of the first user entry, the second entry or the third user entry to the at least one selected league, and the ratio of entry fees of the at least one selected league.

In one or more embodiments, the processor 101 may keep track of the one or more standings of one or more of the first user, the second user and the third user 103, and of the one or more additional users, and display the one or more standings. In at least one embodiment, the processor 101 may apply the weighting based on the one or more standings, and may change the weighting based on the one or more standings of the first user, the second user and/or the third user 103 and the one or more additional users 104. In one or more embodiments, the favorability view may include an indication of the selected one or more players that may improve the first user's standings, the second user's standings and/or the third user's standings.

By way of at least one embodiment, the processor 101 may display one or more match-ups between the first user, the second user or the third user 103 and the one or more additional users 104. In one or more embodiments, the one or more match-ups may include the selected one or more players of the one or more players not associated with the first user, the second user or the third user 103 and that may improve the first user's, second user's or third user's one or more standings.

According to at least one embodiment of the invention, the processor 101 may display one or more playoff eligibility categories associated with the first user, the second user or the third user 103, and associated with one or more games of the one or more leagues, and may change the weighting based on the one or more playoff eligibility categories. By way of one or more embodiments, one or more of the first user, second user or third user may be ineligible to enter a playoff category competition, however such eligibility may be changed dependent on one or more matchups in a selected league the one or more leagues. As such, in at least one embodiment, the processor 101 may change the weighting associated with the one or more players in a match-up between one or more of the first user, second user and third user and the one or more additional players 104. In one or more embodiments, changing of the weighting allows the at least one user 103 to "cheer" for a selected one or more players that may have previously hurt the first user's overall standings if playing across multiple leagues, however, when playing in a single league, the selected one or more players help the first user's overall standings in the single selected league's one or more of user's standings and playoff eligibility.

For example, in at least one embodiment, if one or more of the first user, second user or third user have entered a playoff eligibility category in a first league, and/or have a higher standing in the first league, the weighting may be changed wherein the favorability view may indicate wherein, in a second league, different from said first league, the first user, second user or third user would benefit from "cheering" for one or more players that may have been against said first user, second user or third user, however in the second league are for the first user, second user or third user, in order for the first user, second user or third user to enter a playoff eligibility category in the second league, as will be further discussed below.

In one or more embodiments, the processor 101 may select and display one or more games associated with the one or more fantasy teams of the first user, the second user or the third user 103, wherein the one or more games is associated with at least one player of the one or more players. In at least one embodiment, the processor 101 may select and display the at least one players of the one or more players.

By way of one or more embodiments, the processor 101 may filter the aggregate view to display players of the at least one player currently playing in the selected one or more games. For example, in one or more embodiments, the at least one player currently playing in the selected one or more games may include one or more players in a selected game the at least one user 103 is watching, wherein the processor 101 may display only the players relevant to the specific game being watched of the one or more games and the players currently involved in the selected game being watched. In at least one embodiment, the processor may filter the aggregate view to hide players of the at least one player not currently playing in the selected one or more games. In at least one embodiment, at least one player not currently playing in the selected one or more games may include at least one player who may have finished one or more games, may be injured in one or more games, or the one or more games such players are involved in may have not started, or may be inactive for one or more games for a partial duration of the one or more games, or for the whole duration of the one or more games. The filtering may be performed automatically, for example by a game time and current time comparison by the system that may periodically be performed or by querying the database to determine when a game has started or finished for example or to determine whether a particular player is playing in the game, e.g., not playing if injured, etc.

According to one or more embodiments, the weighting may be applied based on the ratio of one or more of an entry fee from the at least one user to the at least one selected league, such as an entry fee of $10, $1,000 or any other value within the scope of the invention. As such, in at least one embodiment, the difference in the entry fees, and the ratio of one or more entry fees is associated with the weighting applied, wherein a higher ratio may be weighted more heavily than a lower ratio, and/or a higher paid value of the one or more entry fees may be weighted more heavily than a lower paid value of the one or more entry fees. In at least one embodiment, the weighting may be applied, changed and/or altered in the one or more leagues based on a prize incentive (s) in the one or more leagues, wherein a league with at least one prize may be weighting more heavily, and/or a league with a higher prize value may be weighted more heavily. In one or more embodiments, the weighting may be applied based on whether the at least one user 103 is in a selected league with one or more additional users 104 that the at least one user 103 desires to play against in a match-up and/or desired to beat the one or more additional users 104. In one or more embodiments, the weighting may be applied based on if the at least one user 103 desires to win a selected league of the one or more leagues.

In other words, in at least one embodiments, if the at least one user's 103 selected one or more players may be unfavorable to the at least one user 103 as currently is, for example wherein the one or more players are on less teams for the user and more teams for the one or more additional users 104 in at least one league, then the at least one user 103 may provide or apply a weighting that shows the at least one user 103 a "cheer" for message when the selected one or more players scores, when normally the first user 103 would not cheer or "boo" for the selected one or more players that score.

In at least one embodiment, the weighting may be applied only in a single league and the at least one user 103 is able to beat a higher ranked user in the one or more standings. For example, in one or more embodiments, processor 101 looks at the one or more standings of the at least one user 103 and the one or more additional users 104 in one or more leagues, and if a lower ranked user (such as the first user, second user or third user) is in a matchup with a high ranked user (such as the one or more additional users or other users of the at least one user), then the processor 101 may alter the weightings in order to allow the at least one user to "cheer" for selected one or more players on the lower ranked user's team, such as displaying the cheer message, in order to beat the higher ranked user(s) in the one or more standings, even if the processor 101 would normally display a "do not cheer" or "boo" message to the at least one user 103. See FIG. 4, element 410, wherein if the player "Ryan" has a great game, then the first user may move up in the standings even if the player is not on the user's fantasy team at 303b, but is on 3 additional user's teams where the 3 additional users are of a lower standing in the league and 1 addition user's team having a higher standing in the league. In this case, the weighting for that player becomes very high as shown 18.5 so that the first user knows how important that player's performance is. In addition, at 411, if a player is on more higher standing user's teams but would get the first user into the playoffs in a particular highly valued league, then the player may have a weighting applied that counter intuitively should be cheered for even though the player would hurt the first user's standing in multiple leagues, but which would ensure that the first user would get into the playoffs in a highly valued league. Based on the first user's desire to get into the playoffs in that league the weighting could be a ratio of the amount of money spent on the entry fee for the leagues or any other value, here shown as 21.2. Negative values may be shown if the player's performance would hurt the first user's standing, etc. Other values shown in FIG. 4 include −5.8 for a player that hurts the first user, 1.4 for a player that slightly helps a first user even though the player is on the same number of teams for the first user compared to other users, or on the same number of teams for user's having a matchup but which would effect the standing of the first user for example, hence the non-zero favorability. In addition, although shown as for/against whole numbers, percentages may be displayed as desired in any view, or colors or other icons or indicators may be utilized as one skilled in the art will recognize.

Ranges 410*a* and 411*a* show ranges of points that the player may score that may improve the user's standings in one or more strategies. For favorable and unfavorable players, the system may calculate a range of scores 410*a* and 411*a* for one or more players that enables the user to support a player that may help the user in certain leagues and hurt the user in other leagues, wherein the range in one embodiment is based on a first strategy that allows the user to advance in the most leagues or based on weighting of the leagues or players. In other embodiments, a strategy to beat any other player or win a particular league may be utilized to display a different range of values. Weighting may be employed in one or more embodiments. For example, given that a user has a player on two teams while an opponent has the player on a team that is playing the first user, while a second user with a lower ranking has the same player on a team that is playing, then this may be shown as a 3-1 favorability since the lower ranked player may help the first user by beating a higher ranked user for example. In this case, the range of points that may help with first user in one strategy is shown at 410*a* as 7-18 points. Hence, if that player scores within this range, then the first user may move up in the standings in multiple leagues, while a score outside of this range may hurt the first user, for example based on the point differential in the standings the user has in multiple leagues. In one or more embodiments, the system calculates the difference between the points in standings between the first user and other users for the leagues that the first user is in, and by doing so may calculate the tolerance for scoring by the player based on the desired strategy. For example, the players may be weighted and dynamically changed as games start and finish and players are benched or enter a game for example. As this occurs, the system can dynamically update the point ranges that enable the first user to improve in the standings, even if the difference in points may diminish for a particular league based on a player's performance, while maintaining the standing of the first user in a league. For example, if the first user is in two fantasy leagues, and the points in the league for the first user who is in second place in one league is 100 and a second league is 40, while the second and third user are 80 and 111 in the first league and a fourth and fifth user have points of 20 and 42 in the second league, then the system may calculate the points a player scores that would move the first user up in the standings in the first league and second league if possible, or maintain the standing of the first user in the first league while leaping over the fourth and fifth user in the second league. For example, if player "Ryan" is favorable at 3-1 and the first user is behind by 20, 22 and 25 points in three leagues that the player is playing for the first user in three leagues and the first user is leading an opponent by 34 points in another league the player is playing against the first user in. The player's optimal outcome for the first user in order to win all three matchups is to score 26-33 points. If the player scores within this range, the player has put the first user in an optimal position to improve in all four leagues. In another scenario, if the player with range 7-18 as shown at 410*a* scores 12 points, then the first user may move up the standings in the first league while if the player is on the fourth player's team in a second league then this performance may not improve the fourth user's standing over the first user in the second league as the points would be improved to 32, which would still be under the first user's points in the second league. In some cases, a strategy may be utilized to calculate the range of scores to improve in as many leagues as possible by iterating over all league standing scores and taking into account any set of players that may affect the standings and refining the calculation as games start and end and players begin playing or stop playing. As these numbers are exemplary, one skilled in the art will recognize that displaying a range of scores may be based on a number of strategies of which maintaining standings, improving the most standings, or winning a particular highly weighted league or other strategies that the user may desire to utilize.

In at least one embodiment, the processor 101 may change or alter the weightings based on if the at least one user 103 has already made the playoffs in a certain league(s) but not other leagues of the one or more leagues, such that the weighting may be changed based on the league(s) that the at least one user 103 has not reached or entered the playoffs or playoff eligibility category. As such, in one or more embodiments, the weighting may be changed or altered to utilize the one or more user matchups from a subset of leagues, even if the performances of the one or more players may hurt the at least one user 103 overall, the processor 101 may display a "cheer for" message to the at least one user 103 in order to allow the at least one user 103 to get to the playoffs in the subset of leagues and enter a playoff eligibility category.

In one or more embodiments, the processor 101 may alter or change the matchups in the one or more leagues, such that even if one or more players are not on the at least one user's team, the "cheer for" or "boo/not cheer for" messages, or favorability views, may display to the at least one user 103 who to "cheer for" or "boo/not cheer for" based on the one or more players that the one or more additional users 104 in the one or more leagues have, in order for the at least one user 103 to increase in the one or more standings and improve their standings. In at least one embodiments, the processor 101 may keep track of all of the one or more standings of the one or more leagues and identify the users above or below the at least one user 103 in one or more league standings, and may generate suggested weightings based on which users are matched up with other users in the one or more leagues, in order to maximize the probability of the at least one user 103 moving up/increasing in the one or more standings of the one or more leagues.

By way of one or more embodiments, the player favorability view may also include a player achievements view that may contain player achievements associated with one or more of the players. The player achievements associated with each of the one or more players may include one or more of a player yardage, the player points scored during a game, the player catches, the player runs, the player passes, the player interceptions, or any other offensive or defensive play the player attains, or any other statistics related to the specific sport for example, or any combination thereof as one of ordinary skill in the art would recognize.

Figure 4:
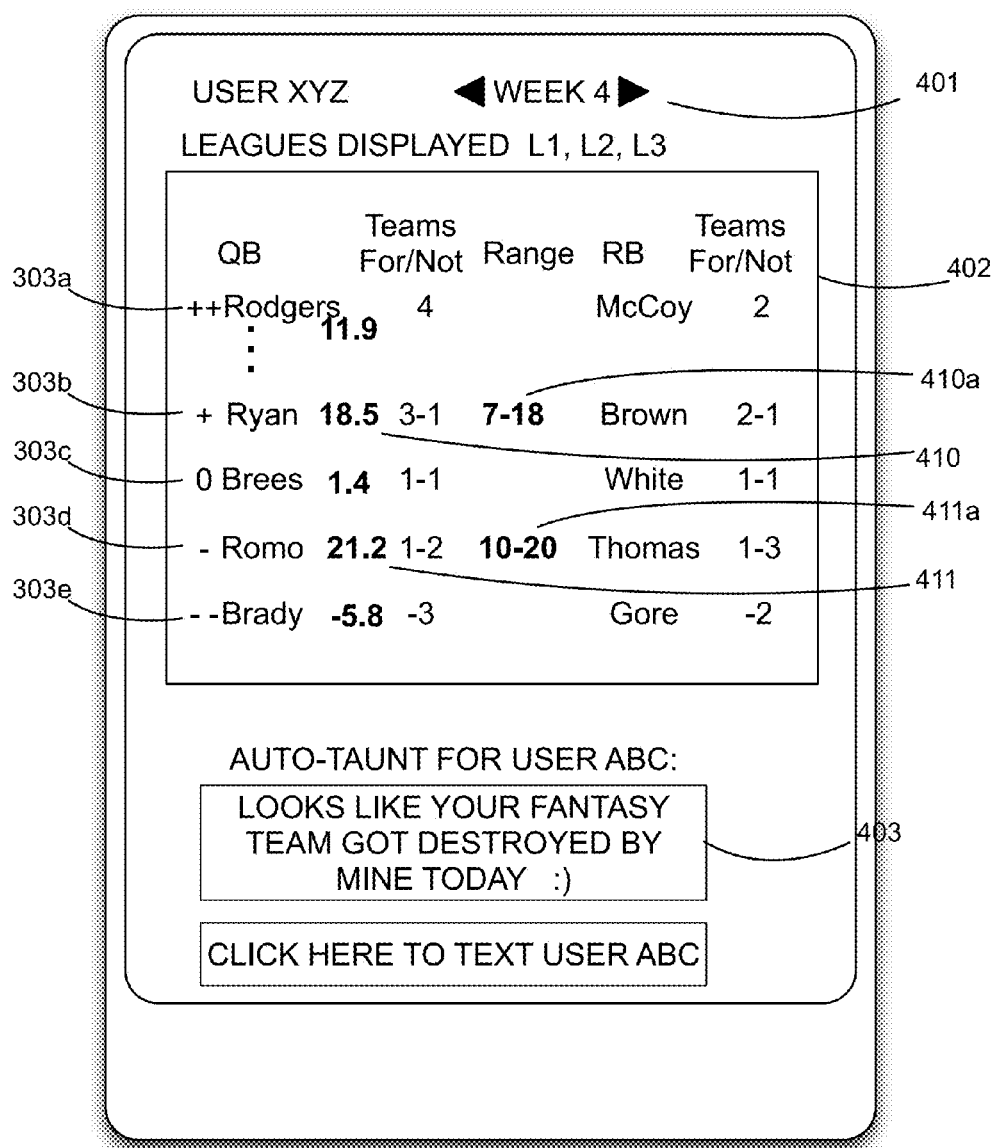
FIG. 4 shows an exemplary mobile version of the interface with fine-grained favorability display and exemplary taunting message.

FIG. 4 shows an exemplary mobile version of the interface with fine-grained favorability display and exemplary taunting message. The figure displays the exemplary favorability view and league display on a mobile phone screen, however it is noted that any screen may be used to display the player favorability views and league views, including but not limited to desktop computers, laptop computers, tablet computers, Smart phones, or any other type of computer. The display includes the user associated with the league view and player favorability view as "USER XYZ", the list of leagues displayed as "LEAGUES DISPLAYED L1, L2, L3" and the week number 401, such as "WEEK 4", associated with the player favorability view and league view. In one or more embodiments, the week number 401 allows a user to scroll forward and backward between weeks to compare the data from one week to another week, so that the user may scroll back and forward in time to view favorability of players over time. Element 402 is a display of the one or more players in each of the selected leagues the at least one user selects with player name, player team, player position and a player points for each of the one or more players, for example using a fine-grained five category view. Display 402 may also include a display of one or more active or optionally bench players includes a player name, a player team and a player position for each of the one or more players, and the display of one or more opponent players includes a player name, a player team, a player position and a player points for each of the one or more players.

Other embodiments may also display an informatory message during or after a performance that enables the user to cheer or not cheer or otherwise inform additional user's as to the at least one user's fantasy team performance, in area 403, e.g., one or more taunting messages for the at least one user 103 to relay or that is automatically texted or otherwise transmitted to the additional one or more users 104 such as "User XYZ's Fantasy Team moves up two spots in your Fantasy League based on your Fantasy Players relatively dismal performance today", or "Looks like your fantasy team got destroyed by mine today", or any other taunting or informatory message, such as CHEER NOW, Player "Rodgers" has just scored and is "for" you. In one or more embodiments, the one or more taunting messages may be automatically relayed using live-feedback obtained data during a live sports game and/or from previous data attained during previous sports games, as discussed previously and/or otherwise tweeted or broadcast to any existing social media sites. Auto-taunt messages may be generated during a game, after a game, after a game day, after a game week or at any other interval in keeping with the spirit of the invention. In addition, once a player has finished a game, the system may display a symbol, e.g., an "F" for "Final", next to the player's name, or alternatively, the player may be eliminated from the display in order to show only current players worthy of cheering or not cheering for, or otherwise providing negative feedback based on the potential hostility of the current crowd viewing the game proximal to the user.

Figure 5:
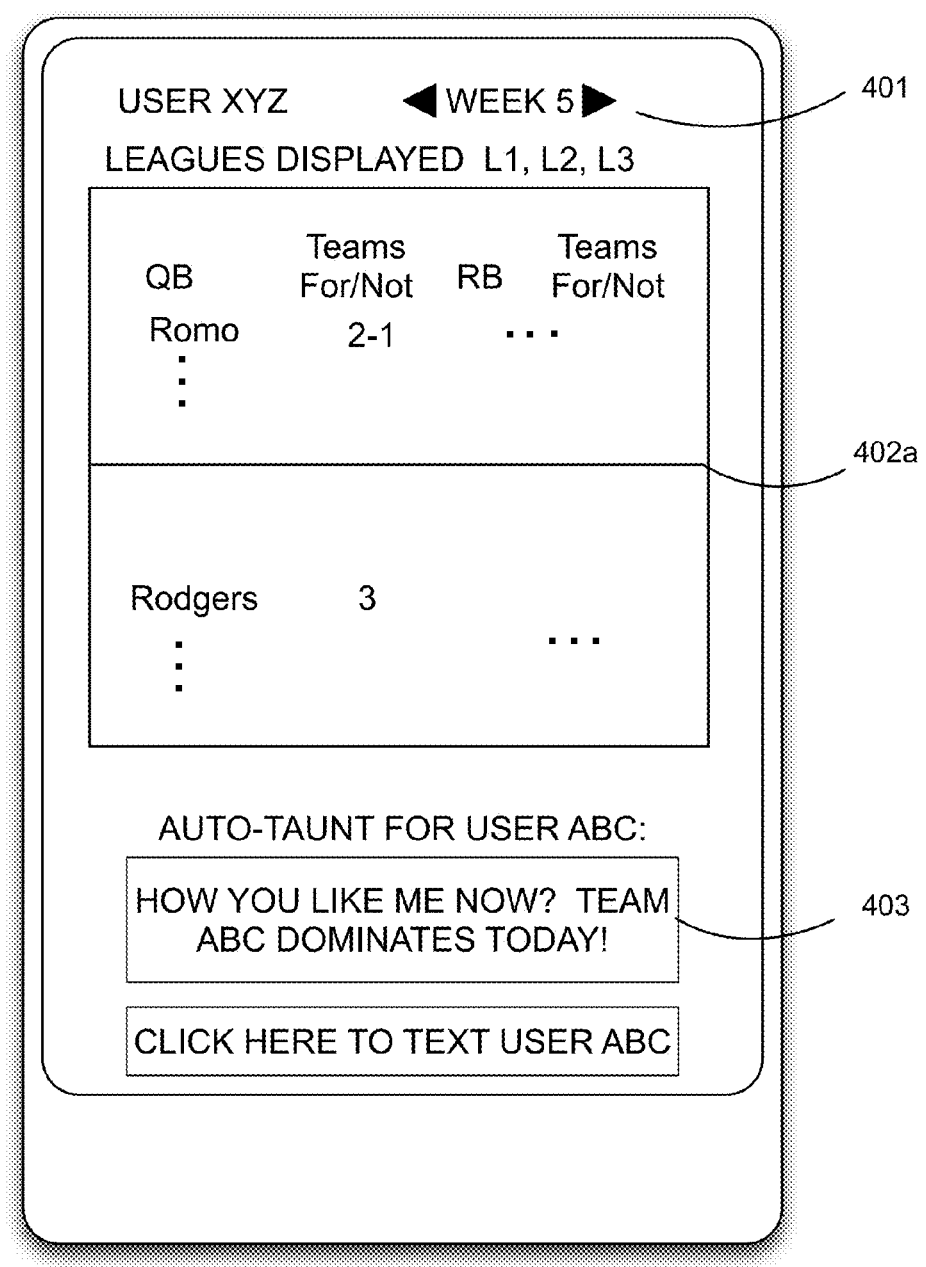
FIG. 5 shows an exemplary interface with a coarse-grained favorability display and exemplary taunting message.

In addition, according to one or more embodiments of the invention, processor 101 displays a "CLICK HERE TO TEXT USER" button, that allows the at least one user 103, such as "USER XYZ" of FIG. 4, and/or FIG. 5, to text the one or more additional users 104, such as "USER ABC" of FIG. 4, a manual taunting message.

FIG. 5 shows an exemplary interface with a coarse-grained favorability display and exemplary taunting message. The figure displays the exemplary favorability view and league display on a mobile phone screen, however it is noted that any screen may be used to display the player favorability views and league views, including but not limited to desktop computers, laptop computers, PDAs, Smart phones, PC tablets, etc. FIG. 5 displays the user associated with the league view and player favorability view as "USER XYZ", the list of leagues displayed as "LEAGUES DISPLAYED L1, L2, L3" and the week number 401, as "WEEK 5", associated with the player favorability view and league view. In one or more embodiments, the week number 401 allows a user to scroll forward and backward between weeks to compare the data from one week to another week, so that the user may scroll back and forward in time to view favorability of players over time.

The display in FIG. 5, relating to Week 5 for example, depicts updated player favorability information under each category, player, team position, etc., compared to the display shown in FIG. 4 relating to Week 4. In addition, as games go final, the players listed may also be designated as such as previously discussed or eliminated from the display. Element 402a is an updated display of the one or more players in each of the selected leagues the at least one user selects with player name, player team, player position and a player points for each of the one or more players. Display 402a may also include a display of one or more active or optionally bench players includes a player name, a player team and a player position for each of the one or more players, and the display of one or more opponent players includes a player name, a player team, a player position and a player points for each of the one or more players. In addition, one or more embodiments of the invention enable the user to switch between display 402 and 402a, i.e., fine-grained category display to coarse-grained category display by double tapping in the center of the screen for example. Any other gesture, such as shaking the mobile computer may be utilized to scroll through taunting messages or switch between display types.

For example, according to Week 4 of FIG. 4, QB Romo is rated at "1-2" suggesting that the at least one user 103 or the one or more additional users 104, should not cheer for Romo in Week 4. According to Week 5 of FIG. 5, QB Romo rating has changed to "2-1", suggesting that the at least one user 103 or the one or more additional users 104, may begin cheering for Romo in Week 5. In another example, according to Week 4 of FIG. 4, QB Rodgers is at "4", suggesting that the at least one user 103 or the one or more additional users 104, should cheer for Rodgers in Week 4. According to Week 5 of FIG. 5, QB Rodgers is now at "3", suggesting that the at least one user 103 or the one or more additional users 104 should not cheer for Rodgers in Week 5. Although the provided examples relate specifically to QB positions, as one of ordinary skill in the art would appreciate, comparisons, differences and updates are applicable to all players of all positions, teams and leagues. With at least one league and large numbers of players with respect to additional users, embodiments of the invention enable the user to know when to cheer for a player performance or not.

Figure 6:
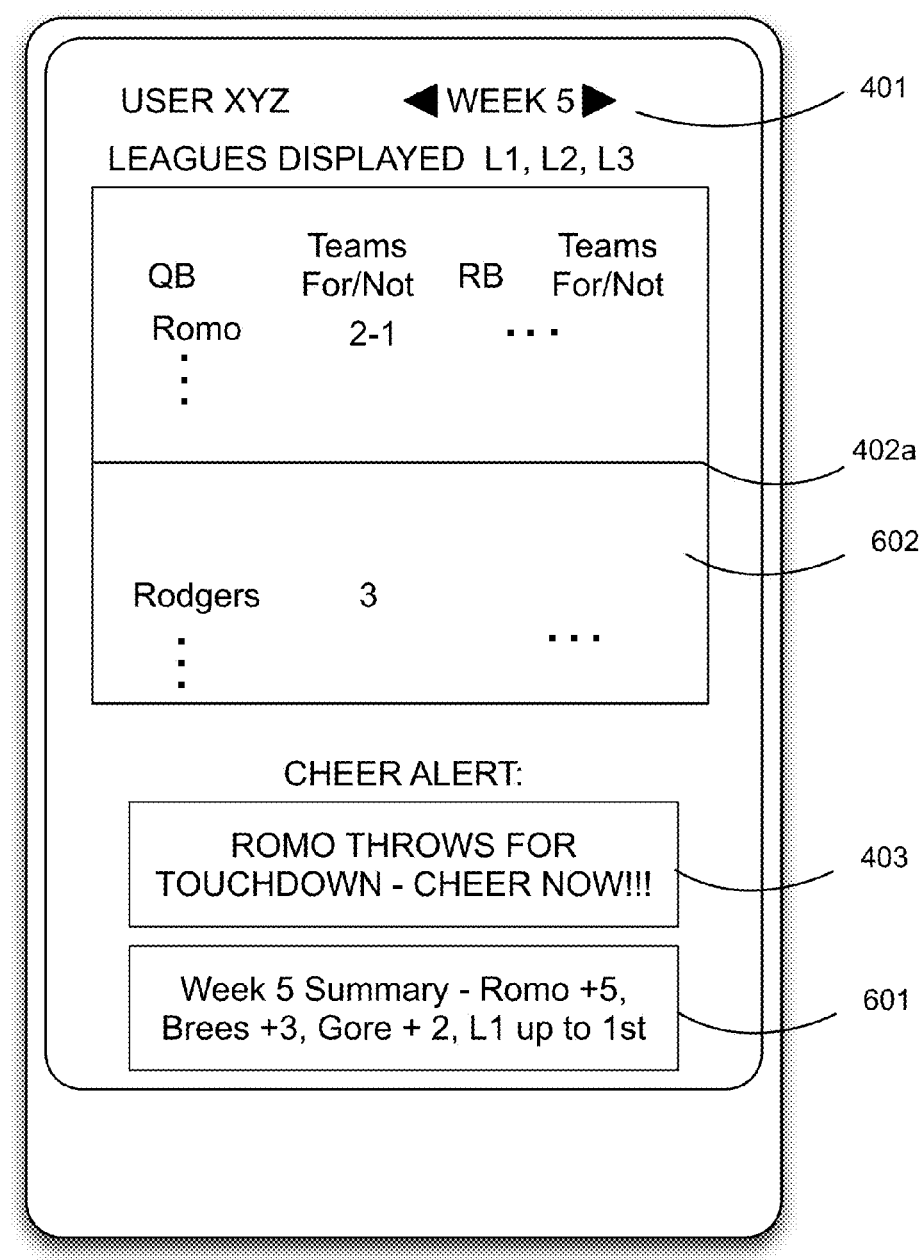
FIG. 6 shows an exemplary interface with a coarse-grained favorability display and cheer alert and snapshot area.

FIG. 6 illustrates the display of FIG. 5 as a player performance is shown in the information area 403. For example, as processor 101 detects a player performance by scanning the at least one external server 105 or otherwise parsing webpages or in any other manner, if the player performance helps the user, then a cheer alert may be shown in area 403, along with a vibration, or sound such as a cheering sound, or any combination thereof on the computer associated with the user, e.g., mobile device 106 after processor 101 pushes the notification to the mobile device or after the mobile device polls the processor for example. In one or more embodiments, processor 101 may email or text user 103 as well, alone or in combination with the cheer alert displayed in area 403. In addition, as games go final, players may be removed from the category lists shown in area 602 or anywhere else on the display. In addition, as shown in area 601a summary report or other final snapshot of the stats of the game, day, week or other interval may be shown, or otherwise emailed or texted to the user. This enables a user to quickly find out the summary of the league play after arriving from a trip for example, or otherwise being out of communication range during play for example. The snapshot or summary shown in area 601 may include games currently being played, to be played, e.g., a list of players for/against a user right before a game to remind the user who to potentially cheer for, or a final snapshot of the game, day, week or other interval as previously discussed. Thus embodiments of the invention enable a user to rapidly determine whether to cheer or not cheer a particular player performance based on involvement in at least one fantasy league whether sport, game or notoriety related or with respect to any other type of fantasy league.

While the invention herein disclosed has been described by means of specific embodiments and applications thereof, numerous modifications and variations could be made thereto by those skilled in the art without departing from the scope of the invention set forth in the claims.

What is claimed is:

1. A fantasy league weighted aggregation system comprising:
    a processor;
    wherein said processor is configured to
        bidirectionally communicate with at least one external server via a bidirectional communication link;
        accept a first set of sports league data from at least one user, wherein said at least one user comprises a first user, a second user and a third user;
        accept a second set of sports league data from said at least one external server associated with one or more additional users;
            wherein each of said first set of sports league data and said second set of sports league data comprise one or more leagues said at least one user and said one or more additional users are associated with respectively, and
            wherein each of said one or more leagues said at least one user and said one or more additional users are associated with comprise one or more fantasy teams, one or more players within each of said one or more fantasy teams, player statistics associated with each of said one or more players and player achievements associated with each of said one or more players;
        accept a first user selection from said at least one user, wherein said at least one user selection comprises one or more selections from said first set of sports league data;
        combine said at least one user selection and said second set of sports league data from said at least one external server to make a combination;
            wherein said at least one user selection comprises said one or more leagues said at least one user is associated with and said one or more players said at least one user is associated with within said one or more leagues;
        apply a weighting to at least said one or more players if said weighting exists;
        display an aggregate view of said combination based on said weighting, wherein said aggregate view comprises
            said player statistics of said one or more players associated with said at least one user;
            a combination of said player achievements associated with said first user, said second user or said third user or any combination thereof and from said second set of sports league data from said at least one external server associated with said one or more additional users; and
            a player favorability view of said one or more players;
        wherein said player favorability view is based on said weighting of said at least one or more players and a plurality of player strength categories associated with each player of said one or more players, and
        wherein said plurality of player strength categories comprise
            a first player category that lists players that are for said first user, or said second user or said third user, and are only on one or more fantasy teams from one or more of fantasy teams associated with said first user, said second user or said third user and not said one or more additional users,
            a second player category that lists players that are favorable to said first user, said second user or said third user, and are on one or more fantasy teams from said one or more fantasy teams associated with said first user, said second user or said third user than are on one or more fantasy teams from said one or more fantasy teams associated with said one or more additional users,
            a third player category that lists players that are neutral to said first user, said second user or said third user, and are on the same number of fantasy teams from said one or more fantasy teams associated with said first user, said second user or said third user, and said one or more additional users, and
            a fourth player category that lists players that are unfavorable to said first user, said second user or said third user, and are on less fantasy teams from said one or more fantasy teams associated with said first user, said second user or said third user than are on fantasy teams from said one or more fantasy teams associated with said one or more additional users,
            a fifth player category that lists players that are against said first user, said second user or said third user and are only on fantasy teams from said one or more fantasy teams associated with said first user, said second user or said third user and not associated with said one or more additional users.

2. The fantasy league weighted aggregation system of claim 1, wherein
    said player statistics of said one or more players associated with said first user, said second user or said third user further comprises said first user having a first standing in said one or more leagues, or said second user having a second standing in said one or more leagues or said third user having a third standing in said one or more leagues or any combination thereof, wherein said second user has a lower standing in said one or more leagues than said first user and is in a matchup with said third user wherein said third user has a higher standing in said one or more leagues than said first user;
    said first player category that lists players that are for said first user, or said second user or said third user further comprises list of players that are for said first user or for said second user having a lower standing in said one or more leagues than said first user and are only on one or more fantasy teams from one or more of fantasy teams associated with said first user or said second user and not said one or more additional users or said third user,
    said second player category that lists players that are favorable to said first user, said second user or said third user further comprises list of players that are favorable to said first user or said second user having a lower standing in said one or more leagues than said first user and are on one or more fantasy teams from said one or more fantasy teams associated with said first user or said second user than are on one or more fantasy teams from said one or more fantasy teams associated with said one or more additional users or said third user,
    said third player category that lists players that are neutral to said first user, said second user or said third user further comprises list of players that are neutral to said first user or for said second user having a lower standing in said one or more leagues than said first user and are on the same number of fantasy teams from said one or more fantasy teams associated with said first user or said second user and said one or more additional users or said third user, and said fourth player category that lists players that are unfavorable to said first user, said second user or said third user further comprises list of players that are unfavorable to said first user or for said second user having a lower standing in said one or more leagues than said first user and are on less fantasy teams from said one or more fantasy teams associated with said first user or said second user than are on fantasy teams from said one or more fantasy teams associated with said one or more additional users or said third user, said fifth player category that lists players that are against said first user, said second user or said third user further comprises list of players that are against said first user or for said second user having a lower standing in said one or more leagues than said first user and are only on fantasy teams from said one or more fantasy teams associated with said first user or said second user and not associated with said one or more additional users or said third user.

3. The fantasy league weighted aggregation system of claim 2, wherein said processor is configured to apply a zero weighting to players on said fantasy teams associated with said second user and said third user to display matchups that involve said first user.

4. The fantasy league weighted aggregation system of claim 2, wherein said processor is configured to apply a non-zero weighting to players on said fantasy teams associated with said second user and said third user to display other matchups that do not involve said first user.

5. The fantasy league weighted aggregation system of claim 1, wherein said weighting is configured to be one or more of generated by said processor and accepted from said at least one user.

6. The fantasy league weighted aggregation system of claim 1, wherein said processor is further configured to accept one or more of an entry from said first user to at least one selected league of said one or more leagues, and a ratio of entry fees of said at least one selected league of said one or more leagues paid for by said first user, wherein said weighting is based on one or more of
said first user entry to said at least one selected league, and
said ratio of entry fees of said at least one selected league.

7. The fantasy league weighted aggregation system of claim 2, wherein said processor is further configured to keep track of said one or more standings of one or more of said first user, said second user and said third user, and of said one or more additional users, and display said one or more standings.

8. The fantasy league weighted aggregation system of claim 7, wherein said processor is further configured to apply said weighting based on said one or more standings.

9. The fantasy league weighted aggregation system of claim 2, wherein said favorability view further comprises an indication of said selected one or more players that are configured to improve said first user's standings.

10. The fantasy league weighted aggregation system of claim 8, wherein said processor is further configured to change said weighting based on said one or more standings of said first user and said one or more additional users.

11. The fantasy league weighted aggregation system of claim 9, wherein said processor is further configured to display one or more match-ups between said first user and said one or more additional users.

12. The fantasy league weighted aggregation system of claim 11, wherein said one or more match-ups comprise said selected one or more players of said one or more players not associated with said first user and configured to improve said first user's one or more standings.

13. The fantasy league weighted aggregation system of claim 8, wherein said processor is further configured to display one or more playoff eligibility categories associated with said first user and associated with one or more games of said one or more leagues, and change said weighting based on said one or more playoff eligibility categories.

14. The fantasy league weighted aggregation system of claim 1, wherein said processor is further configured to
select and display one or more games associated with said one or more fantasy teams of said first user, wherein said one or more games is associated with at least one player of said one or more players, and
select and display said at least one players of said one or more players.

15. The fantasy league weighted aggregation system of claim 13, wherein said processor is further configured to filter said aggregate view to display players of said at least one player currently playing in said selected one or more games.

16. The fantasy league weighted aggregation system of claim 15, wherein said processor is further configured to filter said aggregate view to hide players of said at least one player not currently playing in said selected one or more fantasy league games.

17. The fantasy league weighted aggregation system of claim 1, wherein said processor is further configured to calculate and display a range of scores for said one or more players based on a strategy that improves the standing of the first user in at least one of said one or more leagues.

18. A fantasy league weighted aggregation system comprising:
a processor;
wherein said processor is configured to
bidirectionally communicate with at least one external server via a bidirectional communication link;
accept a first set of sports league data from at least one user, wherein said at least one user comprises a first user, a second user and a third user;
accept a second set of sports league data from said at least one external server associated with one or more additional users;
wherein each of said first set of sports league data and said second set of sports league data comprise one or more leagues said at least one user and said one or more additional users are associated with respectively, and
wherein each of said one or more leagues said at least one user and said one or more additional users are associated with comprise one or more fantasy teams, one or more players within each of said one or more fantasy teams, player statistics associated with each of said one or more players and player achievements associated with each of said one or more players;
accept a first user selection from said at least one user, wherein said at least one user selection comprises one or more selections from said first set of sports league data;
combine said at least one user selection and said second set of sports league data from said at least one external server to make a combination;
wherein said at least one user selection comprises said one or more leagues said at least one user is associated with and said one or more players said at least one user is associated with within said one or more leagues;

apply a weighting to at least said one or more players if said weighting exists;

display an aggregate view of said combination and said weighting, wherein said aggregate view comprises said player statistics of said one or more players associated with said at least one user;

a combination of said player achievements associated with said first user, said second user or said third user or any combination thereof and from said second set of sports league data from said at least one external server associated with said one or more additional users; and a player favorability view of said one or more players;

wherein said player favorability view comprises said weighting of said at least one or more players and a plurality of player strength categories associated with each player of said one or more players, and wherein said plurality of player strength categories comprise a first coarse-grained player category that lists
players that are for said first user, or said second user or said third user, and are only on one or more fantasy teams from one or more of fantasy teams associated with said first user, said second user or said third user and not said one or more additional users, or players that are favorable to said first user, said second user or said third user, and are on one or more fantasy teams from said one or more fantasy teams associated with said first user, said second user or said third user than are on one or more fantasy teams from said one or more fantasy teams associated with said one or more additional users;

a second coarse-grained player category that lists
players that are unfavorable to said first user, said second user or said third user, and are on less fantasy teams from said one or more fantasy teams associated with said first user, said second user or said third user than are on fantasy teams from said one or more fantasy teams associated with said one or more additional users, or players that are against said first user, said second user or said third user, and are only on fantasy teams from said one or more fantasy teams associated with said first user, said second user or said third user and not associated with said one or more additional users.

19. The fantasy league weighted aggregation system of claim 18, wherein said player statistics of said one or more players associated with said first user, said second user or said third user further comprises said first user having a first standing in said one or more leagues, or said second user having a second standing in said one or more leagues or said third user having a third standing in said one or more leagues or any combination thereof, wherein said second user has a lower standing in said one or more leagues than said first user and is in a matchup with said third user wherein said third user has a higher standing in said one or more leagues than said first user;

said first coarse-grained player category that lists players that are for said first user, or said second user or said third user further comprises list of players that are for said first user or for said second user having a lower standing in said one or more leagues than said first user and are only on one or more fantasy teams from one or more of fantasy teams associated with said first user or said second user and not said one or more additional users or said third user, or said first coarse-grained player category that lists players that are favorable to said first user, said second user or said third user further comprises list of players that are favorable to said first user or said second user having a lower standing in said one or more leagues than said first user and are on one or more fantasy teams from said one or more fantasy teams associated with said first user or said second user than are on one or more fantasy teams from said one or more fantasy teams associated with said one or more additional users or said third user, said second coarse-grained player category that lists players that are unfavorable to said first user, said second user or said third user further comprises list of players that are unfavorable to said first user or for said second user having a lower standing in said one or more leagues than said first user and are on less fantasy teams from said one or more fantasy teams associated with said first user or said second user than are on fantasy teams from said one or more fantasy teams associated with said one or more additional users or said third user, or said second coarse-grained player category that lists players that are against said first user, said second user or said third user further comprises list of players that are against said first user or for said second user having a lower standing in said one or more leagues than said first user and are only on fantasy teams from said one or more fantasy teams associated with said first user or said second user and not associated with said one or more additional users or said third user.

20. The fantasy league weighted aggregation system of claim 18, wherein wherein said processor is further configured to calculate and display a range of scores for said one or more players based on a strategy that improves the standing of the first user in at least one of said one or more leagues.

* * * * *